3,591,501
LUBRICANT CONTAINING A HYDROXY-SUBSTITUTED PHOSPHINE OXIDE

William F. Olszewski, Cherry Hill, N.J., and Herbert Myers, Plymouth Meeting, Pa., assignor to Mobil Oil Corporation
No Drawing. Filed Jan. 24, 1969, Ser. No. 793,879
Int. Cl. C10m 1/44
U.S. Cl. 252—49.8                                8 Claims

ABSTRACT OF THE DISCLOSURE

The invention provides lubricant compositions comprising an organic fluid of lubricating viscosity and a hydroxy-substituted organophosphine oxide. The composition has improved load carrying properties.

BACKGROUND OF THE INVENTION

Field of the invention

The invention relates to lubricant compositions, and in particular to lubricating compositions comprising an organic fluid of lubricating viscosity and a hydroxy-substituted organophosphine oxide, said composition having improved load carrying properties.

Description of the prior art

U.S. Pat. No. 3,126,416 describes the preparation of hydroxy-substituted organophosphine oxides containing mixed alkyl and aryl groups. Neither this patent, nor any known art discloses the use of the compounds described herein as lubricant additives.

SUMMARY OF THE INVENTION

In accordance with the present invention, there is provided an organic fluid composition comprising a major proportion of an organic fluid of lubricating viscosity and a minor proportion sufficient to impart load carrying properties thereto of a hydroxy-substituted organophosphine oxide.

The hydroxy-substituted organophosphine oxide has the formula

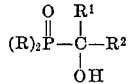

wherein R, R$^1$, and R$^2$ may be the same or different alkyl, cycloalkyl, aralkyl, aryl, alkaryl, and the substituted derivatives thereof, wherein the substituent may be a portion of the ring structure or attached to the alkyl or aryl groups or to either moiety in the alkaryl or aralkyl group, and contain atoms selected from the group consisting of nitrogen, oxygen, sulfur and halogen. In particular, R, R$^1$ and R$^2$ are selected from the group consisting of: (a) alkyl, cycloalkyl and heterocyclic groups containing from 1 to about 20 carbon atoms; (b) aryl, aralkyl and alkaryl groups containing a total of from 6 to about 30 carbon atoms; and (c) the substituted members of (a) and (b). The substituent is a member of the group consisting of halogen (chlorine, fluorine, bromine and iodine), hydroxy, nitro, amino and mercapto when attached as the terminal portions of said groups. Also, the heterocyclic group will contain a substituent from the group consisting of nitrogen, oxygen and sulfur, and the alkyl groups may contain such atoms as portions of the molecule between consecutive atoms in the chain.

The organophosphine oxides of this invention when incorporated with organic fluids, give lubricating compositions having good load carrying properties.

DESCRIPTION OF SPECIFIC EMBODIMENTS

The organophosphine oxides of this invention may be produced by any known method, as for example the method described in U.S. 3,126,416.

In general, a secondary organophosphine oxide may be prepared by reacting a diorgano phosphonate with 2 equivalents of a Grignard reagent substantially according to the equation.

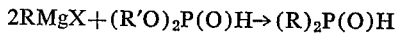

The secondary organophosphine oxide is then reacted with a ketone to yield the hydroxy-substituted organophosphine oxide substantially as follows:

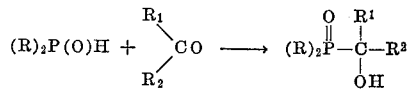

The diorgano phosphonate used as the starting material for the secondary phosphine oxide may be prepared by reacting an alcohol or a phenol with phosphorus trichloride in the desired mole ratio. For example, the diaryl phosphonates may be prepared by reacting together phenol, water or an alcohol, and phosphorus trichloride in accordance with the method disclosed in U.S. Pat. No. 3,329,742. The mole ratio of phenol to water or alcohol to phosphorus trichloride is 2 to 1 to 1, and the temperature is within the range of about 25° C. to about 100° C.

As has been stated, the hydroxy-substituted organophosphine oxides disclosed herein are effective to impart load carrying properties to a variety of organic fluids having lubricating viscosity. These organic fluids include, in addition to mineral oils such as naphthenic and paraffinic mineral oils, synthetic oils including hydrocarbon base fluids, glycol ether fluids, poly(organo) siloxane fluids, acetals, polyphenyl ethers, and the synthetic ester fluids produced from monohydric alcohols and polycarboxylic acids, or from polyhydric alcohols, such as trimethylolpropane and pentaerythritol, and carboxylic acids having up to about 20 carbon atoms.

As an example of the hydrocarbon base fluid, there may be mentioned a polyolefinic fluid or a hydrogenated derivative thereof. One suitable fluid is similar to that disclosed and claimed in U.S. Pat. 3,149,178. In this patent, the olefinic fluids are polymerized normal alphamonoolefins which are distilled to yield a dimer fraction and a dimer-free fraction. The dimer-free fraction may be thereafter hydrogenated in the presence of a catalyst, such as boron trifluoride. Other useful olefinic fluids may be prepared in accordance with U.S. Pat. 3,382,291.

The poly(organo)siloxane fluids may be exemplified by those products obtained by reacting a polysiloxane containing the recurring unit

and having a molecular weight of from about 500 to about 10,000 with an unsaturated compound containing at least one double bond; which compound adds to the H of the above-shown structure. The unsaturated compound may be a mono-olefin, e.g., hexene-1, decene-1, etc., a cycloolefin such as cyclohexene or cycloheptene, a polyolefin such as polybutadiene or polymeric materials containing ethylenic unsaturation such as polybutenes, and aromatic olefins such as styrene. Also included are unsaturates such as dioctyl maleate, dioctyl fumarate, methyl-10-undecenoate, and glycerol monooleate. These poly(organo) siloxanes are described in detail in U.S. application Ser. No. 308,335, filed Sept. 23, 1963, now Pat. No. 3,450,736 dated June 6, 1969.

Also included among the useful organic fluids are the dehydrocondensed poly(organo) siloxanes, prepared simply by heating the above poly(organo) siloxane with a hydrocarbyl hydroperoxide, a dehydrocarbyl peroxide, an acyl hydroperoxide or a diacyl peroxide. Of the peroxides, di-tertiary-butyl peroxide is preferred.

The organophosphine oxide additives of this invention are surprisingly active at low concentrations. The most effective concentration thereof in the organic fluid composition will range from about 0.01 to about 10% by weight. Preferably, however, the concentration will range between about 0.03% and 1.0% by weight.

The following examples illustrate the preparation of the organophosphine oxides and their utility in imparting load carrying properties to organic fluids.

EXAMPLE 1

Preparation of

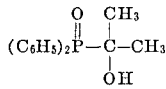

(a) Anhydrous diethyl ether (725 ml.) and magnesium metal turnings (88 g., 3.65 moles) were charged to a 5.0 liter reaction flask. A solution of bromobenzene (500 g., 3.18 moles) in anhydrous diethyl ether (725 ml.) was added dropwise to the flask over a period of 3 hours at a rate which kept the reaction mixture under gentle reflux. When the addition was completed, the reaction was refluxed for an additional 15 minutes.

(b) The reaction mixture was cooled to 0–10° C. in an ice bath and a solution of diethyl phosphonate (146 g., 1.06 mole) in anhydrous diethyl ether (585 ml.) was added dropwise over a period of 3 hours while maintaining the temperature at 0–10° C. After the addition was completed, the reaction mixture was refluxed for 15 minutes.

(c) The reaction mixture was then hydrolyzed by adding 1460 ml. of 10% aqueous hydrochloric acid followed by an equal amount of water (1460 ml. The reaction mixture was charged to a separatory funnel for settling. The lower aqueous layer was discarded. The upper organic layer was extracted several times with 600 ml. portions of 2% aqueous hydrochloric acid.

(d) The combined hydrochloric acid extracts were in turn extracted with several 400 ml. portions of benzene. The combined benzene extracts were dried over anhydrous sodium sulfate.

(e) After removing the benzene by distillation, the diphenylphosphine oxide was topped to a pot temperature of 90° C. at 5 mm. of Hg and filtered (yield, 70 g.).

(f) The diphenylphosphine oxide and excess acetone (150 g.) were warmed on a steam bath for 15 minutes. Upon cooling, the hydroxy-substituted organophosphine oxide precipitated and was collected by suction filtration (yield, 65 g.).

*Product analysis.*—Calculated for $C_{14}H_{17}O_2P$ (percent): phosphorus, 12.5; Chlorine, nil. Found (percent): phosphorus, 11.9; chlorine, nil.

EXAMPLE 2

Preparation of

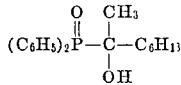

Steps (a) through (e) of Example 1 were repeated, except that in step (e), after removing the benzene, the diphenylphosphine oxide was topped to 95° C. at 200 mm. of Hg. The yield was 98 g.

(f) The diphenylphosphine oxide and excess 2-octanone (150 g.) were warmed on a steam bath for 15 minutes. Upon cooling, the hydroxy-substituted organophosphine oxide precipitated and was collected by suction filtration (yield, 94 g.).

*Product analysis.*—Calculated for $C_{20}H_{27}O_2P$ (percent): Phosphorus, 9.4. Found (percent): Phosphorus, 9.4.

EXAMPLE 3

Evaluation of the compounds

The above compounds were evaluated in the well-known 4-Ball Wear Test. In this test, three steel balls are held stationary while a fourth steel ball is allowed to rotate thereon under a 60 Kg load for a period of 30 minutes. The temperature of the base fluid and the rotational speed of the fourth ball were varied as shown in the table below.

For the purpose of this test, a synthetic base fluid was used. The synthetic fluid was a pentaerythritol ester prepared from technical grade pentaerythritol containing about 88% by weight of monopentaerythritol and about 12% by weight of dipentaerythritol, and 4 moles per mole of said pentaerythritol of a mixture of acids consisting of pelargonic acid and commercial iso-pentanoic acid (which contains both normal valeric and iso-valeric acids). This synthetic base fluid was tested alone and in combination with each of the compounds of Examples 1 and 2 above at concentrations of 0.04% phosphorus. The following are the results.

| System | Scar diameter (mm.)—80° F. | | | |
|---|---|---|---|---|
| | 250 r.p.m. | 500 r.p.m. | 750 r.p.m. | 1,000 r.p.m. |
| Synthetic fluid | 0.50 | 0.72 | 0.85 | 0.93 |
| Synthetic fluid plus 0.34% of compound of Example 1 | 0.51 | 0.60 | | |
| Synthetic fluid plus 0.43% of compound of Example 2 | 0.50 | 0.55 | 0.55 | 0.69 |

| System | Scar diameter (mm.)—390° F. | | | |
|---|---|---|---|---|
| | 250 r.p.m. | 500 r.p.m. | 750 r.p.m. | 1,000 r.p.m |
| Synthetic fluid | 0.69 | 0.91 | 1.00 | 2.24 |
| Synthetic fluid plus 0.34% of compound of Example 1 | 0.43 | 0.55 | | |
| Synthetic fluid plus 0.43% of compound of Example 2 | 0.41 | 0.55 | 0.73 | 1.05 |

It will be noted from the above results that, at the low temperature there is a significant improvement in the performance of the ester at a speed of 500 r.p.m. However, at 390° F., great improvement was noted at all speeds.

While the present invention has been described in considerable detail in connection with a few specific embodiments for specific purposes, it is apparent that novel compositions of this invention are not restricted to such embodiments and details for there are many obvious modifications and variations which enhance their wide application in various types of utilization. Accordingly, the present invention should not be construed as limited in any particulars except as may be recited in the appended claims or required by the prior art.

We claim:

1. An organic fluid composition comprising a major proportion of a lubricating oil and a proportion sufficient to impart load carrying properties thereto of a hydroxy-substituted organo-phosphine oxide of the formula

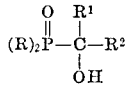

wherein R, $R^1$, and $R^2$ are hydrocarbyl groups of from 1 to about 30 carbon atoms.

2. The composition of claim 1 wherein the said organophosphine oxide is present in a concentration of from about 0.01% to about 10% by weight.

3. The composition of claim 2 wherein the concentration is from about 0.03% to about 1.0% by weight.

4. The composition of claim 1 wherein the organic fluid is a mineral lubricating oil.

5. The composition of claim 1 wherein the organic fluid is a synthetic lubricating oil.

6. The composition of claim 5 wherein the synthetic lubricating oil is a pentaerythritol ester of pelargonic and iso-pentanoic acids.

7. The composition of claim 1 wherein the said organophosphine oxide is

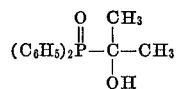

8. The composition of claim 1 wherein the said organophosphine oxide is

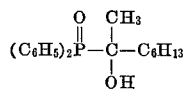

References Cited

UNITED STATES PATENTS

| | | | |
|---|---|---|---|
| 3,239,464 | 3/1966 | Matson et al. | 252—49.8 |
| 3,346,647 | 10/1967 | Garner | 260—606.5 |
| 3,267,149 | 8/1966 | Garner | 260—606.5 |
| 3,271,313 | 9/1966 | Boiselle | 252—49.8 |

DANIEL E. WYMAN, Primary Examiner

W. H. CANNON, Assistant Examiner

U.S. Cl. X.R.

252—46.7, 49.9; 260—606.5P